United States Patent [19]

Ostertag et al.

[11] Patent Number: 5,069,249

[45] Date of Patent: Dec. 3, 1991

[54] SANITARY FITTING

[75] Inventors: Ulrich K. Ostertag; Reinhard F. Ostertag, both of Stuttgart, Fed. Rep. of Germany

[73] Assignee: Hansa Metallwerke AG, Stuttgart, Fed. Rep. of Germany

[21] Appl. No.: 621,894

[22] Filed: Dec. 4, 1990

[30] Foreign Application Priority Data

Dec. 11, 1989 [DE] Fed. Rep. of Germany ....... 3940864

[51] Int. Cl.$^5$ ............................................ F16K 11/065
[52] U.S. Cl. .................................. 137/625.4; 251/50; 251/78; 137/625.17
[58] Field of Search ................. 251/50, 78; 137/625.4, 137/625.17

[56] References Cited

U.S. PATENT DOCUMENTS

| 2,240,560 | 5/1941 | King et al. | 251/78 X |
| 2,384,627 | 9/1945 | Krone et al. | 251/50 |
| 2,830,784 | 9/1988 | Placette | 251/50 X |
| 4,768,749 | 9/1988 | Oberdorfer | 251/50 |

FOREIGN PATENT DOCUMENTS

| 1127723C | 4/1962 | Fed. Rep. of Germany . |
| 3246350A1 | 6/1984 | Fed. Rep. of Germany . |
| 3524149A1 | 1/1987 | Fed. Rep. of Germany . |
| 3534692A1 | 4/1987 | Fed. Rep. of Germany . |
| 3632220A1 | 4/1987 | Fed. Rep. of Germany . |

Primary Examiner—Arnold Rosenthal
Attorney, Agent, or Firm—Fred Philpitt

[57] ABSTRACT

Figure 3:
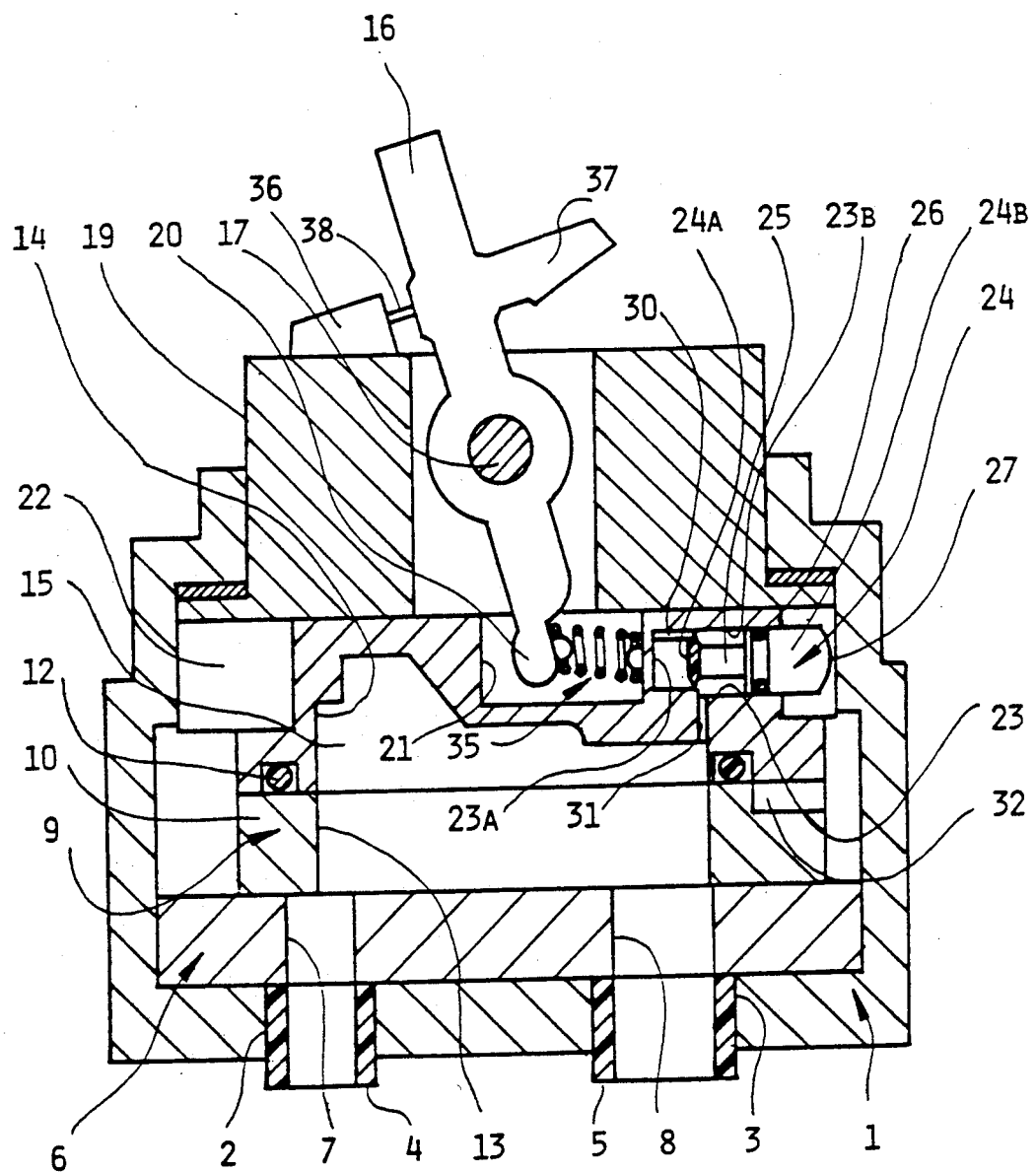

A sanitary fitting contains a closing component (9) which can be moved to vary the quantity of water flowing. A movement brake (23, 24) is provided to prevent excessively fast closing speeds. A spring component (35) is provided in the transmission path (16, 20, 21) between the handle which the user holds and the closing component (9). Through this spring component it is possible for the movement of the handle to be decoupled from the movement of the closing component (9) under the effect of the brake (23, 24) so that very fast movements of the handle are not followed and that, instead, the closing component moves with a time delay and below a permitted maximum speed (FIG. 3).

7 Claims, 4 Drawing Sheets

SANITARY FITTING

DESCRIPTION

The invention refers to a sanitary fitting with:
a) At least one closing component which can be moved to vary the quantity of water flowing.
b) A handle which leads from the power transmission path to the moving closing component.
c) A stop which limits the movement of the handle.
d) A brake which applies a braking force against fast closing movements of the closing component.

Modern sanitary fittings, in particular those which use control disks, often tempt the user to move the handle very quickly. This can lead to undesirable and harmful pressure surges in the pipework connected to the sanitary fitting. Sanitary fittings of the type stated at the outset are already well known. They are described for example in the documents DE-OS 32 46 350, DE-OS 35 34 149 and DE-OS 35 34 692. In all these cases the brake operates so that it attempts to apply a force against the closing force introduced by the hand of the user to brake the movement of the hand and therefore prevent excessively fast closing of the sanitary fitting. This certainly plays a major part in preventing the problems described above.

However, it is very difficult to give quantitative information about the success achieved because this mainly depends upon the extent by which the user allows his hand to be braked. In other words, the efficiency of existing brakes greatly depends upon the power and the "sensitivity" of the relevant user.

Furthermore the moving parts of existing brakes must cope with the whole force applied by the user, which may also be increased through lever mechanisms. This means that considerable stress is applied to the mechanical construction of the brake.

The task involved in this invention is to provide a sanitary fitting of the type stated at the outset in which a maximum closing speed of the moving closing component is guaranteed, irrespective of the relevant user and the method of operation, and at which excessive pressure surges in the pipework are reliably prevented.

This task is solved by the invention in that:
e) A spring component is used in the power transmission path between the stop and the closing component through which the force is applied to the closing component in the direction of closure.

According to the invention the movement of the handle is to a certain extent decoupled from the movement of the closing component. The latter can be "independent" to a certain extent so that even very fast movements of the handle never move the closing component at above a certain speed. This decoupling is produced by the spring provided according to the invention, in that at higher closing speeds it is compressed under the effect of the brake because the velocity of the moving closing component remains below the velocity of the handle. When the handle stops moving when the stop is reached, the closing component continues to move into the fully closed position with a delay as the spring component is released, at a specified maximum speed. The effect of the spring component also limits to a precise and easily determined maximum the forces which act upon the components of the brake.

Generally the force of the brake no longer need be set so hard as it is no longer subject to the direct force of the user but only the maximum set force of the spring component. The risk of damaging the brake through wear or a sudden failure of its seal is therefore largely excluded.

Very many existing sanitary fittings are designed so that a moving control disc is displaced linearly by a pivoting shaft to vary the quantity of water flowing, whereby the shaft acts with a carrier head in an opening in the moving control disc. In this case a design is recommended in which the spring is a thrust spring fitted between one side of the carrier head of the shaft and the adjacent wall of the carrier opening. The thrust spring located between the carrier head of the shaft and the carrier opening represents an easy modification of existing sanitary fittings, so that therefore all sanitary fittings according to the invention remain "compatible" with fittings supplied previously, i.e. are therefore interchangeable for repair or replacement.

In such armature fittings equipped with a pivoting shaft to vary the quantity of water it is also possible to design the units so that the shaft is divided into two sections interconnected by a torsion spring, so that the shaft bends if the torsion spring is under pressure when the brake is producing a braking force while the control washer is displaced.

Within the framework of the invention it is generally not important where the spring component is used in the power transmission path. The precise location is chosen according to the geometrical conditions and the costs involved.

Theoretically it would be possible for the spring component to snap during long use. In this case it would no longer be possible to sully close the sanitary fitting without special measures being taken. If this is to be prevented, the stop in the closing direction can contain a strong spring component which is almost rigid in comparison to normal closing forces but is compressed when much higher forces are applied. The spring should therefore be so strong that the user normally cannot overcome its power in the closing direction. However, if the spring should actually break and the connection between the handle and the moving closing component is lost, this connection could be reinstated by overcoming the force of the strong spring in the stop.

In sanitary fittings already mentioned above which operate with a pivoting shaft, the stop is frequently designed as a hammer which acts against faces located along its movement path. In one design of the invention the hammer can be connected to the shaft through a strong spring. When the poser of this strong spring is overcome it is possible to move the shaft further than normal in exceptional cases where the spring component in the power transmission path to the moving control disc has failed, in order to fully close the closing component.

The constant of the spring component should be matched to the brake so that when it is compressed by an amount corresponding to the path of the brake, it applies a force upon the closing component which with the brake results in the maximum permitted speed of the closing component.

The following section describes in more detail with the aid of the drawing several design examples according to the invention.

FIGS. 1 to 4 show axial cross-sections through a cartridge-type single lever mixer valve at various positions along the closure path.

The single lever mixer valve shown contains a cup-shaped cartridge casing (1) whose base contains two water infeed openings (2) (only one of which is shown in the drawing) and a water return opening (3). Hollow cylindrical seals (4 and 5) are fitted in the water feed openings (2) and the return opening (3) and form a seal against the outer casing of the fitting which is not shown and where the single lever mixer valve is used.

On the base inside the cartridge casing (1) there is a first control disc (6) of a ceramic material which cannot move or rotate and whose upper surface is highly polished. The first control disc (6) also has two water feed openings (7) and a return opening (8) which are connected to the appropriate openings (2, 3) in the base of the cartridge casing (1) or the interior of the seals (4, 5) respectively.

Above the first control disc (6) there is second control disc (9) which can move and rotate in relation to the first control disc (6). This is constructed of a lower, smooth ceramic disc and an upper plastic section (11) through a lock (32) and a seal (12). The ceramic disc (10) is also highly polished on the lower surface which slides on the first control disc (6). It has a large opening (13) which continues upwards in a cut-out (14) in the plastic section (11). The opening (13) in the ceramic disc (10) and the cut-out (14) in the plastic section (11) together form a deflector channel (15) in the second control disc (9) through which water from the feed openings (7) can flow to the return opening (8) of the first control disc (6) when the two control discs (6 and 9) are in the correct relative position.

The second control disc (9) is moved by a shaft (16) which is mounted with a lug (17) in a rotating bearing (18) so that it can pivot and can be turned around the vertical valve axis together with the bearing (18).

An axial extension of the bearing (18) protrudes out of the cartridge casing (1). On its underside the bearing (18) has a groove (22) whose parallel side surfaces are used as guides for the relevant surfaces on the second control disc (9).

The shaft (16) has at its lower end an enlarged carrier head (20) which lies in a opening (21) in the upper face of the second control disc (9). The carrier head (20) lies directly at the left hand surface of the opening (21) in FIG. 1 and also indirectly at the right hand surface of the opening (21) through a thrust spring (35).

A handle (not shown) is connected in the conventional manner to the upper end of the shaft (16).

In the plastic part (11) of the moving control disc (9) there is a brake which together with the thrust spring (35) prevents pressure surges in connected pipework systems even when the handle is operated very quickly. The method is described in detail below. For this purpose a stepped cylindrical hole (23) is provided in the plastic part (11) of the moving control disc (9) whose axis lies parallel to the direction of movement of the control disc (9), i.e. parallel to the plane of contact of the two control discs (6 and 9).

A damper piston (24) designed as a double-acting piston is located in the cylindrical hole (23) so that it can be moved. It contains an inner piston (24a) and an outer piston (24b) which are held apart axially by a rod (25). The inner piston (24a) which acts together with the inner, narrower section (23a) of the cylindrical hole (23) is designed as a flexible lip seal. The outer piston (24b) which acts together with the other outer section (23b) of the cylindrical hole (23) is a rigid unit and has an O-ring seal (26) inserted in its outer wall.

The section which protrudes out of the cylindrical hole (23) is designed as a plunger (27) with a rounded head.

A groove (30) with a low cross-section is provided in the side wall of the inner part (23a) of the cylindrical hole (23). A hole (31) with a small diameter connects the outer section (33b) of the cylindrical hole (23) to the deflector channel (15) of the second control disc (9).

In order to explain the operation of the brake which is formed by the damper piston (24) and the cylindrical hole (23) in the moving control disc (9) we first assume that the thrust spring (35) between the carrier head (20) of the shaft (16) and the carrier opening (21) is a rigid unit. The operation of this thrust spring (35) together with the brake is now explained in more detail below.

Figure 1:
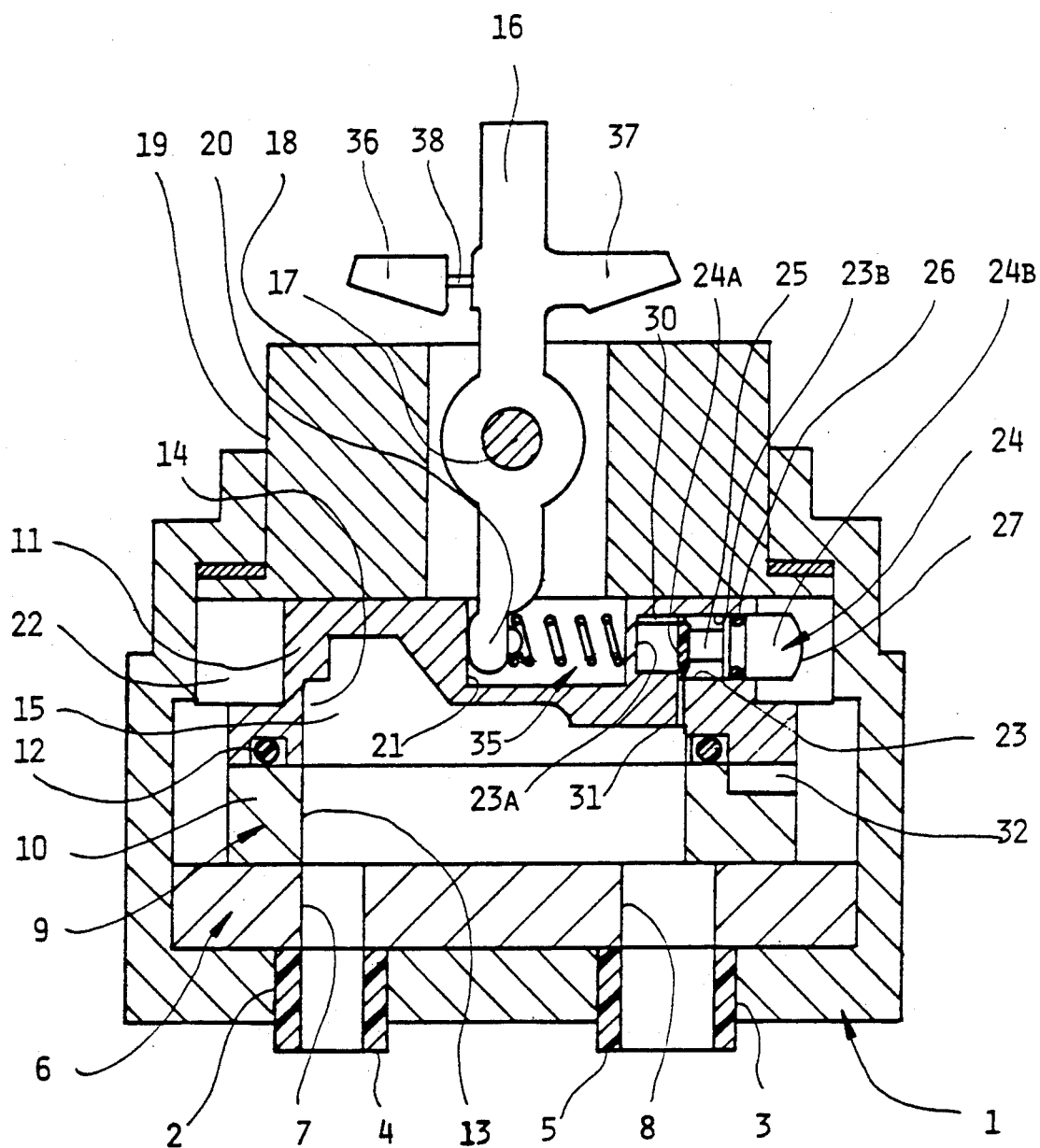

If water flows through the deflector channel (15) in the second control disc (9) when the valve shown in FIG. 1 is open, the cylindrical hole (23) is filled with water through the hole (31). The pressure in the cylindrical hole (23) presses the double-acting piston (24) outwards until a stop (not shown) terminates this movement. In this position, shown in FIG. 1, the plunger (27) of the outer piston (24b) is at a certain distance from the wall of the cartridge casing (1).

If the second control disc (9) in the drawing is now moved to the right to close the valve, this movement is not affected at first. Only if the plunger (27) is in contact with the adjacent wall of the cartridge casing (1) does a type of "damper effect" begin. If the movement of the second control disc (9) to the right continues, the water is forced by the outer piston (24a) through the hole (31) from the outer section (23b) of the cylindrical hole (23) into the deflector channel (15).

At the same time the inner piston (24a) enters the inner cylindrical hole (23a) and forces the water here through the groove (30) into the outer section (23b) of the cylindrical hole (23). The resultant braking force is determined largely by the cross-section of the groove (30) in the wall of the section (23a) of the cylindrical hole (23).

By designing the inner piston (24a) as a lip seal it is possible to make the braking force highly dependent upon the speed of movement of the second control disc (9). If this is high, the pressure in the cylindrical hole (23) holds the seal lip of the inner piston (24a) relatively firmly against the cylinder wall. A displacement of the water from the inner section (23a) of the cylindrical hole (23) is then only possible through the groove (30). If the second control disc (9) moves slowly, however, the pressure in the cylindrical hole (23) is so low that the lip seal of the inner piston (24a) can lift off the cylinder wall and thus provide a relatively large displacement cross-section. The braking force is then hardly noticeable.

If the valve is opened again by moving the second control disc (9) in the drawing to the left, water flows through the hole (31) from the deflector duct (15) into the cylindrical hole (23) and rests the damper piston (24) to the position shown in the drawing.

For the interaction between the thrust spring (35) and the brake in the moving control disc (9) to be described below it is sufficient to know that the brake applies a force which depends upon the speed of the closing movement and is applied when the plunger (27) of the piston (24) comes into contact with the inner surface of the cartridge casing (1).

As long as the speed of movement of the moving control disc (9) is low, also the braking force applied by the brake (the damping piston (24) and the cylindrical hole (23)) is very slight. This means that when the control disc (9) is moved slowly, all processes occur as if there were no brake and thrust spring (35). The thrust spring (35) remains largely uncompressed as it only has to transfer light forces and can therefore be considered as a rigid unit. The moving control disc (9) then directly follows the movement of the shaft (16).

The circumstances differ if the shaft (16) is moved very quickly to the closed position. As an extreme example let us consider a severe impact upon the handle connected to the upper end of the shaft (16).

FIGS. 1 to 4 show momentary illustrations of four points in time during this fast closing movement.

In FIG. 1 the single lever mixer valve is fully open. This is the starting point for the movement. The thrust spring (35) is under normal tension and therefore holds the left hand surface of the carrier head (20) of the shaft (16) against the relevant side of the carrier opening (21) as shown in FIG. 1. The plunger (27) of the damper piston (24) is still some distance from the cartridge wall.

Figure 2:
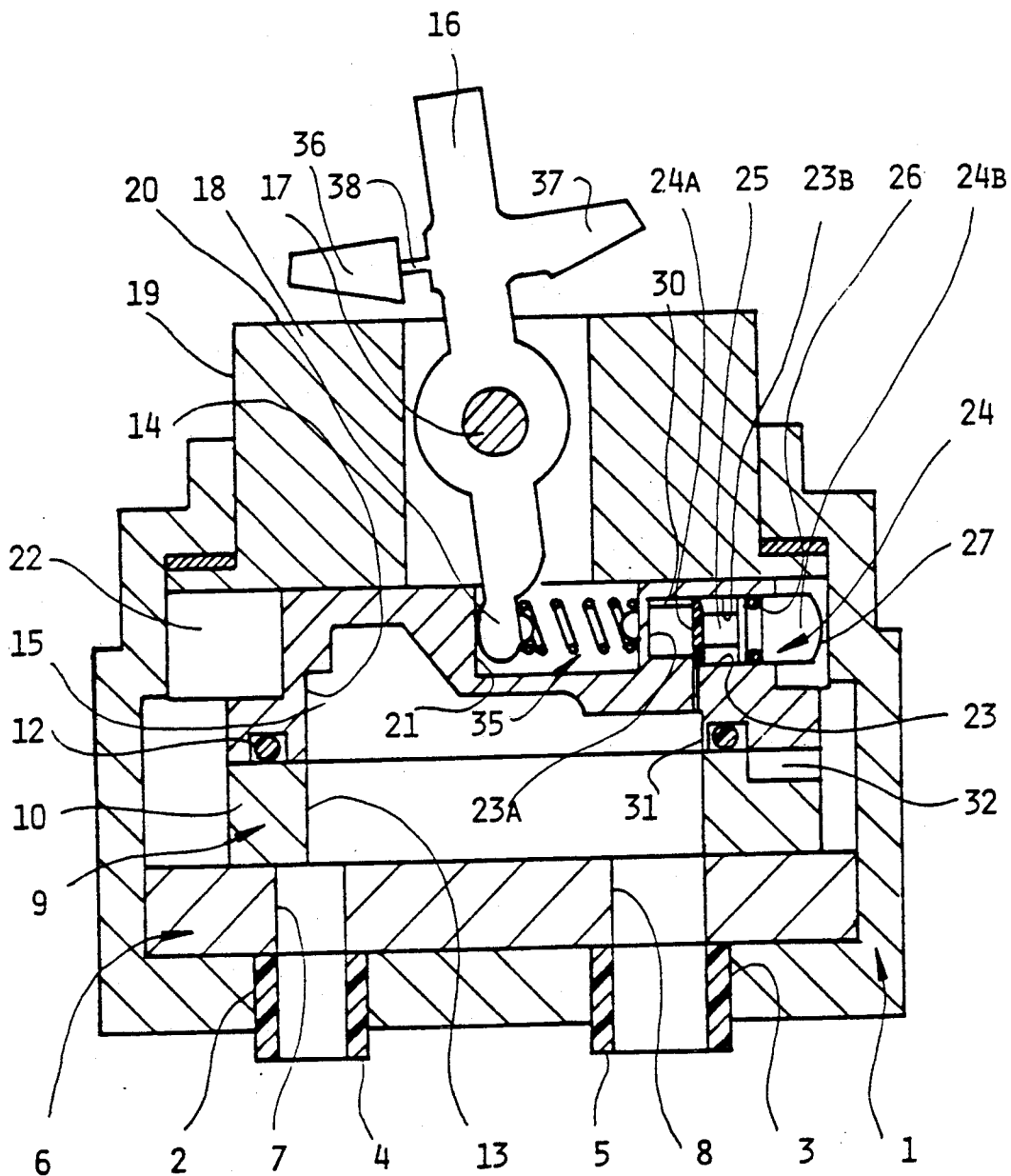

FIG. 2 shows the control disc (9) in the position at which the brake starts to take effect. The plunger (27) of the damper piston (24) is now against the inner wall of the cartridge casing (1). Up to this position any movement of the control disc (9) took place practically without any force, i.e. without any additional compression of the thrust spring (35). The conditions correspond with those applicable to slow closing.

This is where the movement brake starts to take effect, since the movement of the handle connected to the shaft (16) is to be considered as too sudden and too strong. This means that the disc (9) no longer follows the movement of the shaft (16). Initially it almost remains stationary (in fact there is a slight further movement at low speed). As shown in FIG. 3, the shaft (16) moves to the stop (the detailed design of this stop is discussed further below). The thrust spring (35) is compressed. The left hand side of the carrier head (20) of the shaft (16) as shown in FIG. 3 is now a distance away from the relevant side of the opening (21) because the moving disc (9) did not follow the movement exactly.

Figure 4:
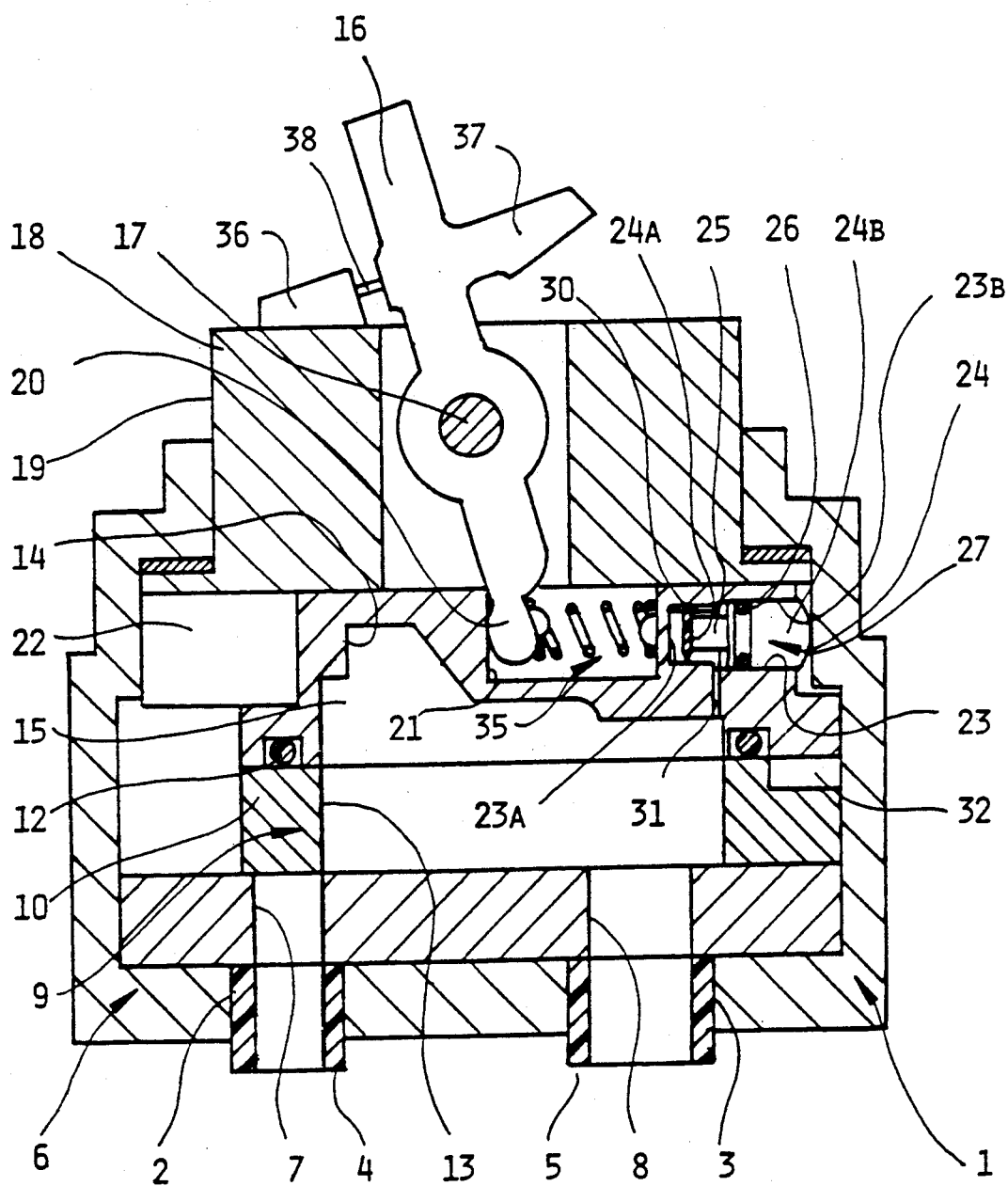

The user feels he has closed the fitting because, of course, he moved the handle until it reached the stop. In fact, however, the closing process within the single lever mixer valve is not yet complete. The processes which represent the changeover from FIG. 3 to FIG. 4 are now taking place in the valve. The thrust spring (35) is released and moves the disc (9) slowly into the actual closed position against the force of the brake. The speed of the movement in this last closing phase depends upon the interaction between the thrust of the spring (35) and the force of the brake.

The maximum speed of movement of the disc (9) can therefore be determined accurately in advance. The constant of the thrust spring (35) and the force of the brake can be balanced as follows:

Initially the maximum permitted closing speed for the disc (9) is determined. Then one can determine the outer force which the thrust spring (35) may apply upon the disc (9) to produce this maximum closing speed. The spring constant of the thrust spring (35) is now selected as follows:

At maximum compression only the force resulting in the maximum permitted closing speed may be applied to the disc (9). The maximum compression is that at which the moving disc (9) remains fully stationary when the movement brake begins to act, whilst the shaft (16) continues to move to the end of its path. This becomes clear from consideration of FIGS. 3 and 4, which show specifically this extreme case. In the design of the brake as explained above, maximum compression of the thrust spring (35) therefore corresponds to the path of the brake, i.e. the distance travelled by the damper piston (24) between the positions shown in FIGS. 3 and 4.

The advantages of the described interaction between the thrust spring (35) and the brake in the moving disc (9) are obvious: Irrespective of how quickly the handle is moved by the user, the disc (9) is only moved at a precisely defined maximum speed during the closing phase, controlled by the brake. Under the given external pressure conditions found in household pipework systems this means that any remaining pressure surge can be predicted quite accurately. The problem of a pressure surge is therefore no longer dependent upon the random parameters of outside control.

The fitting is also always closed reliably through the effect of the thrust spring (35), as the user no longer feels an "apparent stop" when pressing the handle. He assumes this to be the end stop but it is in fact only the point at which the brake comes into effect.

In general it is not necessary to ensure that when releasing the thrust spring (35) from the position shown in FIG. 3 the moving disc (9) is actually moved and not pressed back by the shaft (16). There are several reasons for this:

On the one hand the thrust spring (35) is in contact with the carrier head (20) of the shaft (16) through a lever arm system, so that even with relatively low friction in the shaft pivoting movement the disc (9) is easier to move than the shaft (16). One should remember that due to the configuration described, the braking force produced by the damper piston (24) need not be very high, as was the case in the previous state of the art in technology.

In addition also dynamic processes ensure that the changeover between FIGS. 3 and 4 actually takes place as illustrated: The disc (9) which is of low weight, is already moving towards the closed position. It must be delayed and stopped. At the same time the shaft (16) and the handle attached, which are quite heavy, must be accelerated in the opening direction. These delay or acceleration processes would have to be completed within a very short period of time and this would demand high forces. A third fact which guarantees that the movement will actually be executed in the manner described is that every user leaves his hand on the handle for several tenths of a second when the stop is reached, before releasing the handle. The change between FIGS. 3 and 4 takes place within this period in which the shaft (16) is held in position by the hand of the user.

If all these reasons and measures are not sufficient to prevent the shaft (16) from being pressed back by the thrust spring (35) instead of the movement of the disc (9) according to the changeover between FIGS. 3 and 4, then the friction occurring when moving the shaft (16) would have to be increased artificially.

Theoretically, even if it is highly improbable, it is possible for the thrust spring (35) to fail at some time so that the single lever mixer valve could then not be fully closed without special measures being taken.

To protect against this improbable case the stop has been designed in a special way in the design example illustrated:

As shown in the drawing, two "hammers" (36, 37) are provided on the shaft (16) in the area protruding out of the cartridge casing (1). The pivot movement of the shaft (16) in the opening direction of the valve is stopped when the hammer (37) hits the upper face of the guide (18). The movement of the shaft (16) in the closing direction is similarly limited by the hammer (36) hitting the upper face of the guide (18).

The hammer (37) is generally moulded as a part of the shaft (16). However, a relatively strong leaf spring (38) is located between the hammer (36) and the shaft (37). The strength of this spring (38) is such that it can be considered rigid under the forces normally required to move the disc (9). The function of the hammer (36) as a stop in the closing direction is therefore generally as if the hammer (36) were rigidly connected to the shaft (16). If the thrust spring (35) fails under unfavourable conditions, however, the shaft (16) can be turned further by overcoming the very strong force of the leaf spring (38) and therefore the disc (9) is moved into the fully closed position.

Naturally the spring which disconnects the movement of the disc (9) from that of the shaft (16) need not be located as shown between the carrier (20) and the adjacent wall of the opening (21). Any position between the stop and the moving disc (9) is basically possible, depending upon the geometrical conditions and the resultant costs.

In a design example not shown in drawing the shaft (16) is interrupted approximately at the level of the lug (17). The two parts of the shaft (16) are connected by a torsion spring. In other respects the design coincides with that described above with the aid of FIGS. 1 to 4.

As long as the brake is not active (either because it is outside its normal operating area or through the low speed of the moving disc (9)), this torsion spring which now replaces the thrust spring (35) in the design example illustrated by the drawing transfers the force practically rigidly from one part of the shaft (16) to the other.

However, if the brake applies considerably delayed forces upon the moving disc, the shaft (16) "bends" at the connection point with the elastic deformation of the torsion spring. The "outer" section of the shaft (16) to which the handle is attached moves further until the stop is reached, i.e. the hammer (36) hits the upper surface of the guide (18). The "inner" part of the shaft (16) remains with the moving disc (9). It then pivots slowly under the influence of the torsion spring, and carrying the moving disc (9), until the shaft (16) is straight again. Both parts of the shaft (16) are designed so that they can only bend in one direction, i.e. during the closing process. In the other direction the force is transferred between the two parts of the shaft (16) so that no pressure is applied to the torsion spring and the shaft (16) remains straight.

Overall, the conditions in this second design example coincide exactly with those described for the design example shown in the drawing.

We claim:

1. A sanitary fitting that includes
   (a) at least one closing component which can be moved to vary the quantity of water flowing,
   (b) a handle which is connected by a power transmission path to a closing component,
   (c) a stop which limits the movement of the handle, and
   (d) a brake which applies a force to limit excessively fast movements of the closing component,
   characterized in that:
   (e) a spring component (35) is included in the power transmission path (16, 20, 21) between the stop (18, 36) and the closing component (9) which applies the force to the closing component (9) in the direction of closing.

2. A sanitary fitting according to claim 1, in which a moving control disc is moved linearly by a pivoting shaft to vary the quantity of water flowing and the shaft is inserted into an opening in the moving control disc, characterized in that the spring component (35) is a thrust spring which is fitted between one side of the carrier head (20) of the shaft (16) and the adjacent wall of the carrier opening (21).

3. A sanitary fitting according to claim 1, in which the moving closing component is displaced linearly by a pivoting shaft to vary the quantity of water flowing, characterized in that the shaft is divided into two parts which are connected by a torsion spring so that the shaft bends when the torsion spring is under pressure when the brake applies a force when the moving closing component is displaced.

4. A sanitary fitting according to claim 3, characterized in that both parts of the shaft are interconnected so that they cannot bend upon a movement in the opening direction.

5. A sanitary fitting according to claim 1, characterized in that the stop (18, 36) in the closing direction contains a strong spring component (38) which is almost rigid with normal closing forces, but is compressed when considerably higher forces are applied.

6. A sanitary fitting according to claim 5, in which the stop is designed as a hammer connected to a pivoting shaft, whereby the hammer interacts with a surface on its movement path, characterized in that the hammer (36) is connected to the shaft (16) through a strong spring (38).

7. A sanitary fitting according to claim 1, characterized in that the spring constant of the spring component (35) is determined so that when the spring component is compressed by an amount which corresponds to the movement of the brake (24, 23), it applies a force upon the closing component (9) which, with the brake (24, 23) fitted, results in the maximum permitted speed of the closing component (9).

* * * * *